Dec. 11, 1962   R. R. BOCKEMUEHL ETAL   3,067,610
GATED AMPLITUDE INDICATOR
Filed Oct. 2, 1958
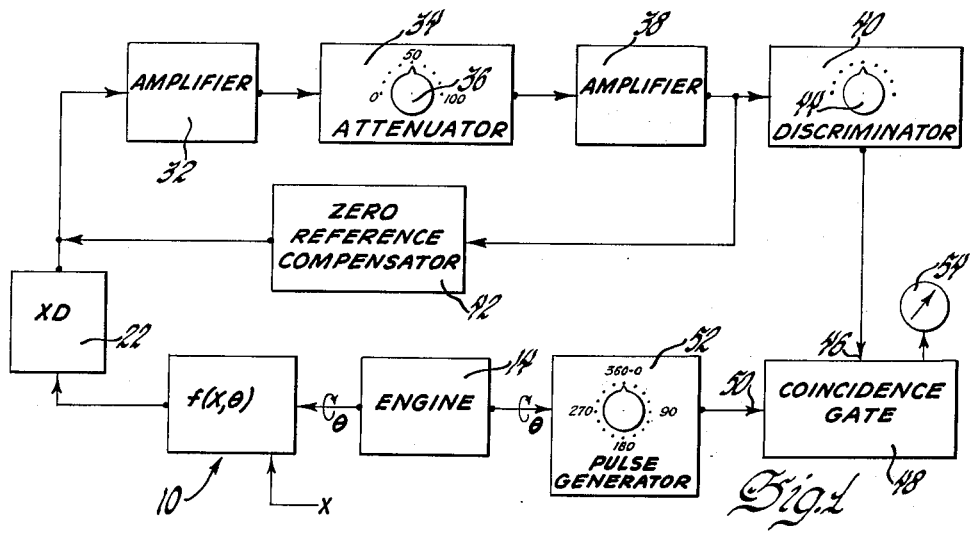
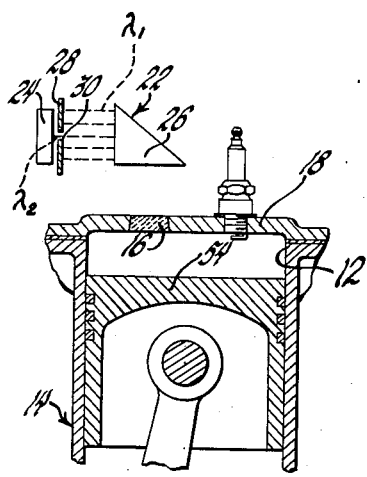
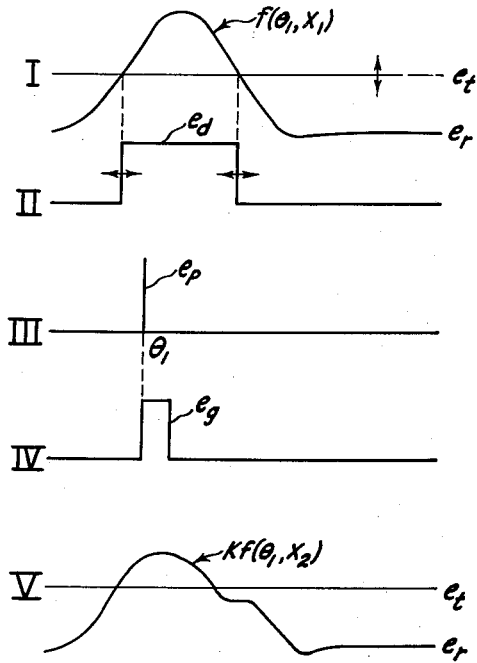
INVENTORS
Robert R. Bockemuehl, &
BY Anthony J. Gioia
D. R. Sadler
ATTORNEY 3,067,610
GATED AMPLITUDE INDICATOR
Robert R. Bockemuehl, Birmingham, and Anthony J. Gioia, Madison Heights, Mich., assignors to General Motors Corporation, Detroit, Mich., a corporation of Delaware
Filed Oct. 2, 1958, Ser. No. 764,964
7 Claims. (Cl. 73—116)

The present invention relates to means for indicating the ratio between the amplitudes of two signals and, more particularly, to means for indicating the ratio between the instantaneous values of two signals at a particular phase angle.

It is frequently desirable to accurately determine the precise ratio between the amplitudes of two signals and particularly during some particular portion of the cycle of the signal if it is periodic or varies cyclically. For example, the temperature of a gas may be determined by means of the ratio of the radiation intensities from the gas as two different wave lengths. Accordingly, it is possible to determine the instantaneous temperature of the gases in an engine cylinder by measuring the ratio between radiation intensities at a particular point in the engine cycle.

One means of determining such a ratio is to measure the amplitude of each of the signals and then determine the ratios therebetween. However, in order to obtain the ratio accurately, it is essential that each of the signals be measured accurately. This, in turn, requires all portions of any circuits such as amplifiers, etc. to be linear throughout the entire range of amplitudes and frequencies encountered. Such an objective is difficult and expensive to obtain.

It is now proposed to provide means for determining the ratio of the amplitudes of two signals which will eliminate the necessity of employing expensive equipment having a high degree of linearity. More particularly, this is to be accomplished by providing a measuring system in which the smaller of the two signals is fed through an attenuator and into means for determining the amplitude thereof. The larger signal is then fed through the attenuator and into the means for indicating amplitudes. By adjusting the attenuator until the amplitude of the larger signal is reduced to equal the smaller signal, the percentage of attenuation will be indicative of the relative amplitudes of the two signals. It should be noted that the output signals from the attenuator will always be the same amplitude. Thus, whenever a comparison of the signals is made, the inputs to the amplifier and measuring apparatus, etc. will be of identical amplitude. Since identical signals will always be identically amplified, the linearity of the amplifier, measuring apparatus, etc. over a range of amplitudes and frequencies will be immaterial.

In the event the present invention is used to measure the instantaneous gas temperatures in a cylinder of an internal combustion engine, the radiation intensities from the gases in the cylinder are sensed at two different wave lengths by means of a suitable transducer such as an infrared spectrometer. The smaller of the two signals is fed through an attenuator and into an amplitude discriminator which is effective to produce an output only when the attenuated signal is equal to at least some predetermined amount. The discriminator is, in turn, fed into a coincidence circuit which is triggered by a pulse that occurs at any preselected engine crankshaft angle. With the attenuator set to pass the entire signal (no attenuation) from the transducer, the threshold level of the discriminator may be adjusted until the output from the discriminator and the reference pulse coincide some predetermined percentage of the cycles. Under these circumstances, the threshold level of the discriminator will correspond to the median or average radiation intensity of the selected wave length at the selected crankangle. The transducer is then adjusted to receive another wave length and the attenuator set so that the output from the discriminator and the reference pulse again coincide the same percentage of cycles. The amount of attenuation by the attenuator will then indicate the ratio of the radiation intensities at the two wave lengths.

In the drawings:
FIGURE 1 is a block diagram of a measuring system embodying the present invention.
FIGURE 2 is illustrations of wave forms in various portions of the system.
FIGURE 3 is a diagrammatic view of the transducer element as applied to a test cylinder of an engine.

Referring to the drawings in more detail, the present invention is particularly adapted to be embodied in a measuring system 10 for determining the instantaneous ratio between two cyclically varying functions such as would be produced from an internal combustion engine. This may be a function of $x$ and $\theta$, where $x$ is some variable and $\theta$ is the angle at which the variable is to be measured. For example, the instantaneous temperatures of the gases in a cylinder 12 of an internal combustion engine 14 at various portions of the engine cycle may be determined by measuring the ratio of the radiation intensities at two difference wave lengths and employing Planck's radiation law, wherein $$\frac{E_1}{E_2}=\frac{e_1}{e_2}\left(\frac{\lambda_2}{\lambda_1}\right)^5\left[\frac{(\exp\ C_2/\lambda_2 T)-1}{(\exp\ C_2/\lambda_1 T)-1}\right]$$

$E_1$ and $E_2$ are the radiation intensities at wave lengths $\lambda_1$ and $\lambda_2$ respectively, $e_1$ and $e_2$ are the emissivities of the gases at the two wave lengths, $C_2$ is Planck's second radiation constant and $T$ is the absolute temperature of the gases. It will be noted that the absolute value of the intensities is not important as long as the ratio therebetween is known.

In order to permit observation of the radiation intensities, a special quartz window 16 is provided in the cylinder head 18 of the engine 14 so radiations from the gases confined in the cylinder 12 may pass therethrough. A transducer 22 is disposed over the quartz window 16 so that the infrared energy radiated from the gases will fall thereon. The transducer 22 comprises a photocell 24 for sensing the radiations and a prism 26 for dispersing the energy into a spectrum. In order to make the transducer 22 monochromatic, a movable screen 28 is disposed between the photocell 24 and the prism 26. This screen 28 has an aperture 30 therein for permitting only radiations of one particular wave length $\lambda_1$ or $\lambda_2$ to pass therethrough and strike the photocell 24.

The photocell 24 will thus produce an output signal that is proportional to the radiation intensities at the wave lengths for which the aperture 30 is positioned. In the event the amplitude of the signal is so low that the background noise in the system 10 will tend to obscure the true value of the signal, it may be desirable to employ an amplifier 32. This amplifier 32 must handle all of the signals from the transducer 22 and, accordingly, is preferably substantially linear over the entire operating range. However, since it is only utilized to improve the signal-to-noise ratio, the amount of amplification required is relatively small and, accordingly, the required linearity can be easily obtained.

The output from the amplifier 32 is interconnected with the input to a variable attenuator 34. This attenuator 34 preferably consists of an entirely resistive potentiometer. The amount of attenuation may be adjusted from 0% to 100% by means of a calibrated dial 36 on the front thereof. Thus the attenuator 34 will be effective to reduce the signal amplitude by some predetermined percentage as indicated on the face of the dial 36. The output of the attenuator 34 is interconnected with an amplifier 38 which, in turn, feeds an amplified and attenuated signal $e_r$ into an amplitude discriminator 40. Although this amplifier 38 may be of any suitable design, in the present instance it comprises the amplifier for the vertical deflection plates of an oscilloscope. The oscilloscope will thus produce a visual display or oscillogram of the function being investigated. In order to maintain a constant zero reference and "clamp" the system 10 against drifting, a compensator 42 such as disclosed and claimed in copending application Serial Number 764,824, filed October 2, 1958, may be employed. Briefly, this compensator 42 employs a photocell that senses the position of a particular portion of the oscillogram and feeds a variable D.C. bias into the transducer output. The amount of this D.C. bias is continuously varied so as to maintain the reference portion of the oscillogram locked in a fixed position.

The discriminator 40 has a variable amplitude threshold level $e_t$ that may be readily adjusted by means of a dial 44 located on the front thereof. In the event the amplitude of the input to the discriminator 40 never equals or exceeds the threshold level $e_t$, there will be no output signal therefrom. However, whenever the amplitude of the input signal reaches the threshold level $e_t$, the discriminator 40 will become conductive and remain conductive until the input is less than the threshold $e_t$. As may be seen by reference to wave form I and II of FIGURE 2, when the instantaneous amplitude of $e_r$ reaches the threshold level $e_t$, the discriminator 40 will become conductive and, as soon as $e_r$ decreases to $e_t$, the discriminator 40 will become nonconductive. Thus the discriminator 40 output signal $e_d$ will consist of a square wave having a fixed amplitude and a variable time duration which is determined by the period of time $e_r$ is greater than $e_t$.

The output signal $e_d$ from the discriminator 40 is interconnected with one input 46 of a normally non-conductive coincident gate circuit 48. The other input 50 of the coincident gate 48 is operatively interconnected with a pulse generator 52. This generator 52 is responsive to the position of the piston 54 or the phase of the cycle. The generator 52 comprises a magnetic slug on the engine flywheel or any other device for producing a pulse $e_p$ of very short time duration whenever the crankangle $\theta$ is some amount. This generator 52 is made adjustable so that the crankangle $\theta$ at which the pulse $e_p$ occurs may be varied to any desired amount.

The coincident gate 48 is normally non-conductive. However, in the event the pulse generator 52 supplies a pulse $_p$ to the input 50 when the discriminator 40 is conducting and supplying a signal $e_d$ to the other input 46, the coincident gate 48 will be triggered to produce an output signal $e_g$. This signal $e_g$ is preferably a pulse that will always have a fixed amplitude and a fixed time duration, i.e.e, the area of the pulses $e_g$ will always be constant. The rate at which the coincidence pulses occur is indicated on the face of the meter 54. Since the areas of the pulse $e_g$ are constant, the meter 54 may be of the averaging type and thereby indicate the percentage of cycles during which coincidence occurs.

The combustion processes in an internal combustion engine are substantially constant from one cycle to the next for any given set of circumstances or operating conditions. However, these are numerous uncontrollable secondary parameters that cause random variations in the combustion process from one cycle to the next. Accordingly, for any given crankshaft angle $\theta$, the temperature of the gases will not necessarily be the same for each cycle. As a consequence, the instantaneous temperatures at a given angle $\theta$ will be statistically distributed about an average or mean amount. If the threshold level $e_t$ and the crankangle $\theta$ are properly chosen, coincidence between the reference pulse $e_p$ from the pulse generator 52 and the square wave $e_d$ from the discriminator 40 will not occur every cycle, but only some percentage of the time. More particularly, if the pulse $e_p$ is approximately coincident with the commencement of the square wave $e_d$, during some cycles the square wave $e_d$ may start ahead of the reference pulse $e_p$ and allow the pulse $e_p$ to trigger the coincidence gate 48. In the remaining cycles the square wave $e_d$ will start after the pulse $e_p$. As a result the coincidence circuit 48 will not be triggered. A similar relation also exists as to the termination of the square wave $e_d$. If the rate of coincidence is 50% at the angle for which the pulse generator is set, the number of cycle when the temperature is less than that represented by threshold level will be equal to the number of cycles when it is greater. Thus, under these circumstances the threshold lever is a function of the mean or average temperature at the angle set by the pulse generator.

In order to make a temperature determination, the aperture 30 is set so the photocell 24 will sense radiations having a wave length of $\lambda_1$ or the signal which has the least radiation intensity. The pulse generator 52 is set to the desired crankangle $\theta$ and the attenuator 34 is set at zero attenuation, i.e., the entire signal is passed through the attenuator 34. The threshold level $e_t$ of the discriminator 40 is then adjusted until the coincidence circuit 48 is operative some predetermined percentage of the time, for example 50%. The aperture 30 is then repositioned so the photocell 24 senses the radiations of the wave length $\lambda_2$ or the radiations producing the larger signal. Without in any way changing the settings of the discriminator 40 or pulse generator 52, the attenuator 34 is then adjusted to attenuate the larger signal until the same coincidence rate as before is obtained. The amount of attenuation, as indicated by the dial 36, will indicate the relative amplitudes of the two radiations' intensities at the particular crankshaft angle $\theta$.

It may thus be seen that even though the amplifier and discriminator are not linear, the signals that are passed therethrough are always of the same amplitude due to the effects of the attenuator. As a result, even though they are not linear, signals of equal amplitudes will be amplified equally. As a result a very accurate determination of the ratio of the signals can be made.

It is to be understood that, although the invention has been described with specific reference to a particular embodiment thereof, it is not to be so limited since changes and alterations therein may be made which are within the full intended scope of this invention as defined by the appended claims.

What is claimed is:

1. In combination, means for deriving a first signal voltage which varies in amplitude with elapsed time, adjustable timing means operating in synchronism with said first signal voltage deriving means for providing a second signal voltage which occurs at a predetermined point in time of said first signal voltage, an adjustable amplitude discriminator capable of passing only signals that have an amplitude that is greater than a predetermined value, an adjustable attenuator, means connecting said adjustable attenuator between said first signal voltage deriving means and the input to said discriminator, a coincidence gate, means connecting the output of said discriminator with said coincidence gate, and a circuit separate from said attenuator-discriminator circuit connecting the output of said timing means with said coincidence gate, said coincidence gate having an output when the signals applied to the gate from the discriminator and timing means occur at the same time.

2. A system for indicating a radiation intensity of a gas whose radiation intensity varies in an interval of time comprising, a monochromatic transducer for producing an electrical signal indicative of a given intensity of said gas at a given wave length, timing means producing a voltage pulse at a predetermined point in time of said time interval, an adjustable attenuator having its input side connected with the output of said transducer, an amplitude discriminator having its input connected with the output of said attenuator, a coincident gate, means connecting said coincident gate with the output of said discriminator, and a circuit separate from said attenuator-discriminator circuit connecting said coincident gate with said timing means, said coincident gate having an output when the signals applied to the gate from the discriminator and timing means occur simultaneously.

3. Means for obtaining an electrical signal that is indicative of the radiation intensity of a gas whose radiation intensity varies over an interval of time, the combination comprising, a monochromatic transducer for producing an electrical signal indicative of the radiation intensity of the gas at a given wave length, an adjustable attenuator operatively connected with said transducer, an amplitude discriminator having an adjustable threshold lever operatively connected with said attenuator for producing a first reference signal whenever the amplitude of the attenuated signal is at least equal to said threshold level, reference means for producing a second reference signal at a predetermined point in said time interval, and a coincidence gate circuit connected with said discriminator and said reference means for producing an output whenever said first and second reference signals occur simultaneously, the circuit connection between said coincidence gate circuit and said reference means being separate from the circuit that includes said attenuator and discriminator.

4. Means for obtaining an electrical signal indicative of the instantaneous radiation intensity of the gases in an engine cylinder at a particular point in the engine cycle, said means comprising a monochromatic transducer for producing an electrical signal indicative of the radiation intensity from said cylinder gases at a particular wave length, an adjustable attenuator operatively connected with said transducer for attenuating said signal, an amplitude discriminator connected with the output of said attenuator and having an adjustable threshold level for producing a first reference signal whenever said attenuated signal is at least equal to said threshold level, reference means for producing a second reference signal at a particular point in the engine cycle of said engine, and a coincidence gate circuit operatively connected with said reference means and said discriminator for producing an output whenever said first and second reference signals occur simultaneously, said reference means being connected with said coincidence gate circuit by a circuit that is separate from the circuit that includes said attenuator and discriminator.

5. Means for obtaining and indicating an electrical signal indicative of the radiation intensity of the gases in an engine cylinder at a particular point in the engine cycle, said means comprising, a monochromatic transducer for producing an electrical signal indicative of the radiation intensity of said cylinder gases at a particular wave length, an adjustable attenuator operatively connected with said transducer for variably attenuating said signal, an amplitude discriminator connected with the output of said attenuator and having an adjustable threshold level for producing a first reference signal whenever said attenuated signal is at least equal to said threshold level, reference means for producing a second reference signal at a particular point in the cycle of said engine, a coincidence gate circuit operatively connected with said reference means and said discriminator for producing an output whenever said first and second reference signals occur simultaneously, the circuit connecting said reference means and said coincidence gate being separate from the circuit connecting said discriminator and attenuator with said gate, and a rate meter operatively connected with said coincidence gate circuit and effective to produce an indication of the rate at which said reference signals occur simultaneously.

6. Means for obtaining an electrical signal indicative of the radiation intensity of the gases in an engine cylinder having a reciprocating piston therein, said means comprising a monochromatic transducer for producing an electrical signal indicative of the radiation intensity from said cylinder gases at a particular wave length, an adjustable attenuator having its input connected with said transducer for attenuating said signal, an amplitude discriminator connected with the output of said attenuator, said discriminator having an adjustable threshold level and being effective to produce a first reference signal whenever said attenuated signal is at least equal to said threshold level, reference means driven in synchronism with said piston for producing a second reference signal whenever said piston is positioned at a predetermined point in its cycle, and a coincidence circuit operatively connected with said reference means and said discriminator for producing an output whenever said first and second reference signals occur simultaneously, said coincidence circuit being connected to said reference means by a circuit that is separate from said attenuator.

7. Means for indicating the instantaneous radiation intensity of the gases in a cylinder having a reciprocating piston therein, said means comprising a monochromatic transducer for producing an electrical signal indicative of the radiation intensity from said cylinder gases at a particular wave length, an adjustable attenuator operatively connected with the output of said transducer for attenuating said signal, an amplitude discriminator connected with the output of said attenuator, said discriminator having an adjustable threshold level and being effective to produce a first reference signal whenever said attenuated signal is at least equal to said threshold level, reference means driven in synchronism with said piston for producing a second reference signal whenever said piston is positioned at a predetermined point in its cycle, a coincidence gate circuit connected with said reference means and said discriminator for producing an output whenever said first and second reference signals occur substantially simultaneously, said coincidence gate circuit being connected with said reference means by a circuit that is separate from said attenuator, and a rate meter operatively connected with said coincidence gate circuit for indicating the percentage of cycles that said reference signals coincide.

References Cited in the file of this patent

UNITED STATES PATENTS

| | | |
|---|---|---|
| 2,275,675 | Draper et al. | Mar. 10, 1942 |
| 2,302,554 | Kingsbury | Nov. 17, 1942 |
| 2,337,522 | Eldredge | Dec. 21, 1943 |
| 2,448,323 | De Boisblanc | Aug. 31, 1948 |
| 2,674,155 | Gibson | Apr. 6, 1954 |
| 2,919,576 | Weller et al. | Jan. 5, 1960 |

OTHER REFERENCES

Article: National Bureau of Standards, Technical Bulletin, vol. 37, No. 8, August 1953. Pages 113–115.